US011997121B2

(12) United States Patent
Araki et al.

(10) Patent No.: US 11,997,121 B2
(45) Date of Patent: May 28, 2024

(54) DETECTION DEVICE, DETECTION METHOD, AND DETECTION PROGRAM

(71) Applicant: NIPPON TELEGRAPH AND TELEPHONE CORPORATION, Tokyo (JP)

(72) Inventors: Shohei Araki, Musashino (JP); Bo Hu, Musashino (JP); Kazunori Kamiya, Musashino (JP); Masaki Tanikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 217 days.

(21) Appl. No.: 17/615,107

(22) PCT Filed: Jun. 4, 2019

(86) PCT No.: PCT/JP2019/022239
§ 371 (c)(1),
(2) Date: Nov. 30, 2021

(87) PCT Pub. No.: WO2020/245930
PCT Pub. Date: Dec. 10, 2020

(65) Prior Publication Data
US 2022/0224705 A1   Jul. 14, 2022

(51) Int. Cl.
*H04L 9/40*   (2022.01)
(52) U.S. Cl.
CPC .................. *H04L 63/1425* (2013.01)

(58) Field of Classification Search
CPC ................................................. H04L 63/1425
(Continued)

(56) References Cited

U.S. PATENT DOCUMENTS

2008/0080518 A1* 4/2008 Hoeflin ............... H04L 63/1425
370/395.42
2010/0162396 A1* 6/2010 Liu ....................... G06F 21/566
709/206

(Continued)

FOREIGN PATENT DOCUMENTS

EP   1 906 620 A1   4/2008
JP   2008-187701 A   8/2008

(Continued)

OTHER PUBLICATIONS

Abhrajit Ghosh, et al., "Managing High Volume Data for Network Attack Detection Using Real-Time Flow Filtering", Management and Visualization of User and Network Data, China Communications, Mar. 2013, 11 pages.

(Continued)

*Primary Examiner* — Michael S McNally
(74) *Attorney, Agent, or Firm* — XSENSUS LLP

(57) ABSTRACT

A detection device includes processing circuitry configured to identify candidate bots using flow data, use the flow data to count a number of the candidate bots communicating with servers, for each of the servers, and determine servers communicating with a predetermined number or more of the candidate bots among the servers to be malicious servers, and detect candidate bots communicating with the malicious servers that are determined among the candidate bots to be malicious bots.

20 Claims, 7 Drawing Sheets

(58) Field of Classification Search
USPC .......................................................... 726/22
See application file for complete search history.

(56) References Cited

U.S. PATENT DOCUMENTS

| | | | |
|---|---|---|---|
| 2010/0281539 A1* | 11/2010 | Burns | H04L 63/1441 726/13 |
| 2011/0055921 A1* | 3/2011 | Narayanaswamy | H04L 63/1458 726/22 |
| 2012/0151033 A1* | 6/2012 | Baliga | H04W 12/122 709/224 |
| 2012/0317641 A1* | 12/2012 | Coskun | H04L 63/1425 726/22 |
| 2016/0359870 A1* | 12/2016 | Gu | G06F 21/564 |
| 2017/0063921 A1* | 3/2017 | Fridman | H04L 63/1466 |

FOREIGN PATENT DOCUMENTS

| | | |
|---|---|---|
| JP | 2010-92236 A | 4/2010 |
| JP | 2015-111770 A | 6/2015 |
| JP | 2015-179416 A | 10/2015 |
| WO | 2017/110099 A1 | 6/2017 |

OTHER PUBLICATIONS

Dainotti et al., "Analysis of a "/0" Stealth Scan from a Botnet", Proceedings of ACM SIGCOMM Internet Measurement Conference, Available Online at:https://ieeexplore.ieee.org/document/6717049, Nov. 14-16, 2012, 13 pages.

Bilge et al., "Disclosure: Detecting Botnet Command and Control Servers Through Large-Scale NetFlow Analysis", Proceedings of the 28th Annual Computer Security Applications Conference, Dec. 2012, Available Online at:https://dl.acm.org/citation.cfm?id=2420969, pp. 129-138.

* cited by examiner

| SOURCE IP ADDRESS | DESTINATION IP ADDRESS | SOURCE PORT NUMBER | DESTINATION PORT NUMBER | PROTOCOL | FLAG | ... |
|---|---|---|---|---|---|---|
| aaa.aaa.aaa.aaa | xxx.xxx.xxx.xxx | 51001 | 80 | TCP | SYN | ... |
| aaa.aaa.aaa.aaa | xxx.xxx.xxx.xxx | 51002 | 80 | TCP | FIN | ... |
| ... | ... | ... | ... | ... | ... | ... |

Fig. 2

| IP ADDRESS OF MALICIOUS SERVER | NUMBER OF BOTS IN WHICH COMMUNICATION HAS BEEN PERFORMED | PORT NUMBER THAT BOT HAS USED FOR COMMUNICATION WITH SERVER | PORT NUMBER THAT BOT IS USING FOR SCANNING |
|---|---|---|---|
| xxx.xxx.xxx.xxx | 43 | 1234 | 445 |
| yyy.yyy.yyy.yyy | 36 | 5678 | 23 |
| zzz.zzz.zzz.zzz | 24 | 9012 | 23 |
| ⋮ | ⋮ | ⋮ | ⋮ |

Fig. 3

| IP ADDRESS OF MALICIOUS BOT | IP ADDRESS OF MALICIOUS SERVER IN WHICH COMMUNICATION HAS BEEN PERFORMED |
|---|---|
| aaa.aaa.aaa.aaa | xxx.xxx.xxx.xxx |
| bbb.bbb.bbb.bbb | xxx.xxx.xxx.xxx |
| ccc.ccc.ccc.ccc | xxx.xxx.xxx.xxx |
| ⋮ | ⋮ |

Fig. 4

NUMBER OF ADDRESSES OF BOT CANDIDATES: 2000

| IP ADDRESS OF MALICIOUS SERVER | NUMBER OF BOTS IN WHICH COMMUNICATION HAS BEEN PERFORMED | PORT NUMBER THAT BOT HAS USED FOR COMMUNICATION WITH SERVER | PORT NUMBER THAT BOT IS USING FOR SCANNING |
|---|---|---|---|
| xxx.xxx.xxx.xxx | 43 | 1234 | 445 |
| yyy.yyy.yyy.yyy | 36 | 5678 | 23 |
| zzz.zzz.zzz.zzz | 24 | 9012 | 23 |
| ... | ... | ... | ... |

TOTAL NUMBER OF MALICIOUS SERVERS: 20
TOTAL NUMBER OF MALICIOUS BOTS: 200

→ IP ADDRESS OF BOT HAVING COMMUNICATED WITH
xxx.xxx.xxx.xxx
· aaa.aaa.aaa.aaa
· bbb.bbb.bbb.bbb
· ccc.ccc.ccc.ccc
...

Fig. 5

DETECTION DEVICE, DETECTION METHOD, AND DETECTION PROGRAM

CROSS-REFERENCE TO RELATED APPLICATION

The present application is based on PCT filing PCT/JP2019/022239, filed Jun. 4, 2019 the entire contents of which are incorporated herein by reference.

TECHNICAL FIELD

The present disclosure relates to a detection device, a detection method, and a detection program.

BACKGROUND ART

Traditionally, attackers have created an attack platform constituted by bots and malicious servers, called a botnet, and have performed cyber-attack activities. For example, a botnet is a platform of attacks constructed in order for attackers to perform cyber-attacks such as denial of service (DoS) attacks. In recent years as IoT has become widespread, it is known to scan with hijacked bots, efficiently spread infection to a large number of IoT devices, and construct a large-scale botnet. As a countermeasure against such a botnet, there is a technique of individually detecting bots and malicious servers from flow data and a darknet.

CITATION LIST

Non Patent Literature

Non Patent Literature 1: "Analysis of a "/0" Stealth Scan From a Botnet", [online], [accessed on May 23, 2019], the Internet <https://ieeexploreleee.org/document/6717049>
Non Patent Literature 2: "DISCLOSURE: Detecting Botnet Command and Control Servers Through Large-scale Net-Flow Analysis", [online], [accessed on May 23, 2019], the Internet <https://dl.acm.org/citation.cfm?id=2420969>

SUMMARY OF THE INVENTION

Technical Problem

However, in the related art, because bots and malicious servers are individually detected from malicious characteristics, there has been a problem in that relationships therebetween cannot be known and the bots and the malicious servers cannot both be detected with a high degree of accuracy. For example, a bot detection method using only a simple number or ratio of SYN packets has a problem of the accuracy of detection results because non-malicious bots such as a web crawler and a researcher's examination bot are also detected.

Means for Solving the Problem

In order to solve the above problems and achieve the object, according to the present disclosure, there is provided a detection device including processing circuitry configured to identify candidate bots using flow data, use the flow data to count a number of the candidate bots communicating with servers, for each of the servers, and determine servers communicating with a predetermined number or more of the candidate bots among the servers to be malicious servers, and detect candidate bots communicating with the malicious servers that are determined among the candidate bots to be malicious bots.

Effects of the Invention

According to the present disclosure, there is an effect that it is possible to detect both bots and malicious servers with a high degree of accuracy.

BRIEF DESCRIPTION OF DRAWINGS

FIG. 2 is a diagram illustrating an example of flow data stored in a flow data storage unit.
FIG. 3 is a diagram illustrating an example of information stored in a detection result storage unit.
FIG. 4 is a diagram illustrating an example of information stored in the detection result storage unit.
FIG. 5 is a diagram illustrating an example of output results.

DESCRIPTION OF EMBODIMENTS

Hereinafter, embodiments of a detection device, a detection method, and a detection program according to the present application will be described in detail with reference to the accompanying drawings. Meanwhile, the detection device, the detection method, and the detection program according to the present application are not limited to these embodiments.

First Embodiment In the following embodiment, the configuration of a detection device 10 according to a first embodiment and a flow of processing operations of the detection device 10 will be described in order, and the effects of the first embodiment will be finally described.

Figure 1:
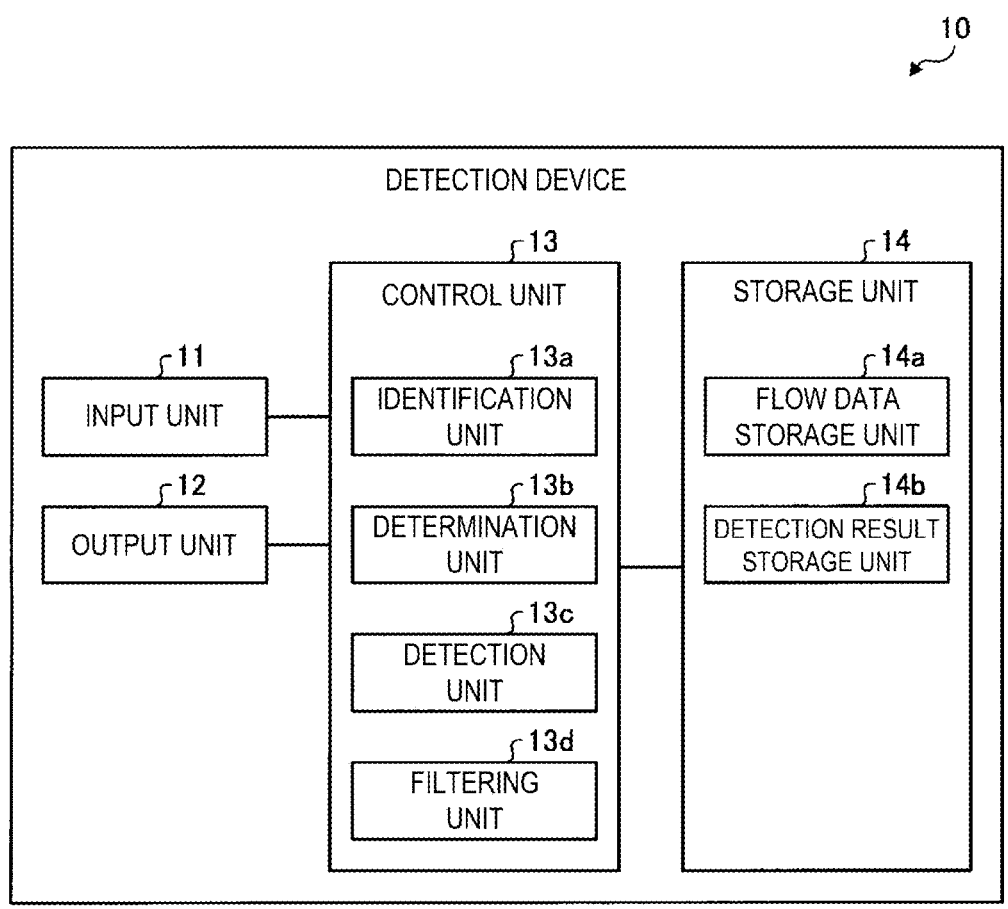
FIG. 1 is a diagram illustrating an example of a configuration of a detection device according to a first embodiment.

Configuration of Detection Device First, the configuration of the detection device 10 will be described with reference to FIG. 1. FIG. 1 is a diagram illustrating an example of a configuration of the detection device 10 according to the first embodiment. As illustrated in FIG. 1, the detection device 10 includes an input unit 11, an output unit 12, a control unit 13, and a storage unit 14. Hereinafter, processing of each unit included in the detection device 10 will be described.

The input unit 11 is implemented using an input device such as a keyboard, a mouse and the like, and inputs various types of instruction information to the control unit 13 in response to an operator's input operation. The output unit 12 is implemented by a display device such as a liquid crystal display, a printing device such as a printer, an information communication device, a speaker, and the like, and outputs, for example, the IP address of a malicious server, the IP address of a malicious bot, and the like to be described below.

In addition, the storage unit 14 stores data and programs required for various processing operations performed by the control unit 13. The storage unit 14 includes a flow data storage unit 14a and a detection result storage unit 14b. For example, the storage unit 14 is a semiconductor memory element such as a random access memory (RAM) or a flash memory, a storage device such as a hard disk or an optical disc, and the like.

The flow data storage unit 14a stores flow data which is input from the input unit 11. For example, the flow data is communication information such as netflow, sflow, and packet capture, and includes a source IP address, a destination IP address, a source port number, a destination port number, a protocol, a flag, and the like.

Here, an example of information stored in the flow data storage unit 14a will be described with reference to FIG. 2. FIG. 2 is a diagram illustrating an example of flow data stored in the flow data storage unit. For example, as illustrated in FIG. 2, the flow data storage unit 14a stores, for traffic data, a "source IP address" indicating the IP address of a source, a "destination IP address" indicating the IP address of a destination, a "source port number" indicating the port number of a source, a "destination port number" indicating the port number of a destination, a "protocol" indicating a communication protocol, and a "flag" indicating the control flag of a TCP header.

The detection result storage unit 14b stores the IP address of a malicious server and the IP address of a malicious bot detected in a detection processing to be described below. For example, as illustrated in FIG. 3, the detection result storage unit 14b stores the number of bots in which communication has been performed, a port number that the bot has used for communication with a server, and a port number that the bot is using for scanning, for each IP address of a malicious server. Further, as illustrated in FIG. 4, the detection result storage unit 14b stores the IP address of a malicious bot and the IP address of a malicious server having communicated with the malicious bot in association with each other. FIGS. 3 and 4 are diagrams illustrating an example of information stored in the detection result storage unit.

The malicious server referred to here indicates a command and control (C & C) server that distributes a malicious executable file (malware) or issues a command to a bot, a proxy server for disturbing a communication destination, and the like. In addition, the term "bot" refers to a host that acts mechanically. Much of IoT malware causes bots to perform scanning on the Internet in order to look for new infection destinations. Some bots include hosts such as a Web crawler or a researcher's investigation, and are not always malicious hosts. In addition, the term "malicious bot" refers to a bot having communicated with a malicious server.

The control unit 13 has an internal memory for storing programs and required data in which various processing procedures and the like are defined, and executes various processing operations therethrough. For example, the control unit 13 is an electronic circuit such as a central processing unit (CPU) or a micro processing unit (MPU), or an integrated circuit such as an application specific integrated circuit (ASIC) or a field programmable gate array (FPGA). In addition, the control unit 13 includes an identification unit 13a, a determination unit 13b, a detection unit 13c, and a filtering unit 13d.

The identification unit 13a identifies candidate bots using flow data. Specifically, the identification unit 13a acquires flow data stored in the flow data storage unit 14a, and identifies candidate bots using statistical characteristics from the flow data. For example, the identification unit 13a calculates the ratio of SYN packets to total transmission packets per predetermined time for each IP address, and identifies an IP address transmitting the SYN packets at a ratio equal to or higher than a threshold as a bot candidate.

Meanwhile, the identification unit 13a may identify the IP address of a bot candidate from the flow data through pattern matching utilizing a blacklist of bots.

The determination unit 13b uses the flow data to count the number of candidate bots having communicated with each server, and determines a server communicating with a predetermined number or more of candidate bots to be a malicious server. That is, the determination unit 13b counts how many bots have communicated with each server from the flow, and detects a server communicating with the number of bots that cannot happen by bot scanning activity alone as a malicious server.

For example, the determination unit 13b counts the number of candidate bots having communicated with a server by setting an ACK flag in TCP communication, and determines a server communicating with a predetermined number or more of candidate bots as a malicious server. That is, the determination unit 13b counts the number of bot candidates having communicated with a server by setting an ACK flag required for actually exchanging packets in TCP communication, and detects an IP address communicating with a threshold number or more of bots as a malicious server. Because the server detected by counting only bots that have actually communicated with the server among bots suspected of being malicious in this manner is actually exchanging some kind of data with the bots and has been communicating with the number of bots that cannot happen by chance such as in the case of bot scan activity, it can be determined to be a malicious server.

The detection unit 13c detects a candidate bot having communicated with the malicious server determined by the determination unit 13b as a malicious bot. That is, because a bot having been communicating with a malicious server is considered to have been communicating with the malicious server with some kind of purpose other than scanning, it can be determined to be a malicious bot.

In this manner, the detection device 10 achieves detection of both a malicious bot and a malicious server constituting a botnet. In addition, in the detection device 10, when only more malicious objects are obtained, the degree of accuracy may be further enhanced by filtering. Although filtering processing in which the filtering unit 13d detects only more malicious objects will be described below, the filtering processing may be omitted, and the detection device 10 may not have the filtering unit 13d.

The filtering unit 13d may output a server determined to be a malicious server a predetermined threshold number of times or more in the past among servers determined to be malicious servers by the determination unit 13b. That is, in a case where a server has been detected a threshold number of times or more in the past, it can be determined that the detected server is not subject to concentration of scanning from a bot by chance but communicates with the bot many times. Thus, the filtering unit 13d may detect only a server determined to be a malicious server a predetermined threshold number of times or more in the past as a malicious server.

In addition, the filtering unit 13d may output a bot the port number of which used for scanning is different from a port number of which used for communication with a malicious server, among bots detected as malicious bots, as a malicious bot. That is, in a case where a port number that the bot has used for scanning and a port number that the bot has used for communication with a server are different from each other, it can be understood that the bot has communicated with the server for purposes other than scanning. Thus, it can be understood that the communication is not for scanning, and it can be determined to be malicious communication.

In this manner, in the detection device 10, when an input of flow data is accepted as input data, as illustrated in FIG. 5, the IP address of a malicious server having been communicating with a plurality of bots and the IP address of a malicious bot having communicated with the server are output as detection results. In addition, as illustrated in FIG. 5, the detection device 10 also outputs information on a port number that a bot is using for scanning, a port number that the bot has used for communication with a malicious server, and the number of bots having communicated with a server as detection results, which makes it possible to determine the degree of maliciousness of the server and the scale of a botnet. In addition, the detection device 10 may output the number of addresses of bot candidates, the total number of malicious servers, and the total number of malicious bots as detection results. FIG. 5 is a diagram illustrating an example of output results.

Figure 6:
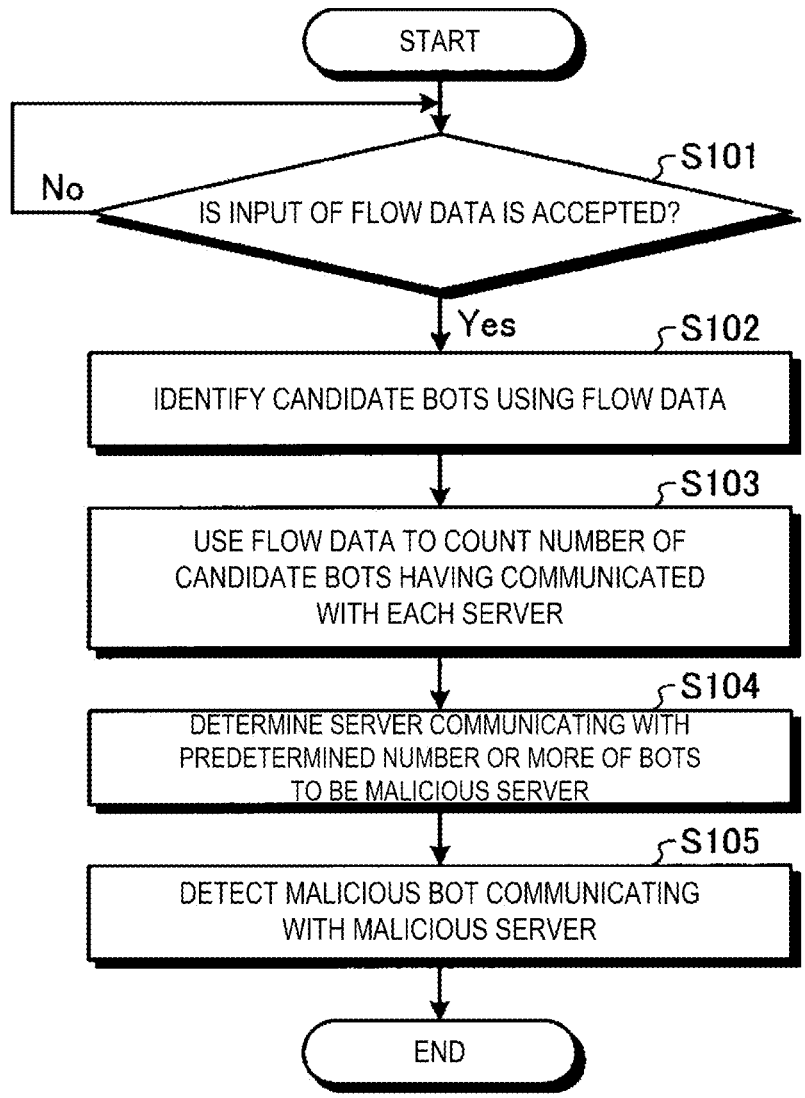
FIG. 6 is a flowchart illustrating an example of a flow of processing operations in the detection device according to the first embodiment.

Processing Procedure of Detection Device Next, an example of a processing procedure performed by the detection device 10 according to the first embodiment will be described with reference to FIG. 6. FIG. 6 is a flowchart illustrating an example of a flow of processing operations in the detection device according to the first embodiment.

As illustrated in FIG. 6, in a case where the detection device 10 accepts an input of flow data (Yes in step S101), the identification unit 13*a* identifies candidate bots using the flow data (step S102). For example, the identification unit 13*a* calculates the ratio of SYN packets to total transmission packets per predetermined time for each IP address, and identifies an IP address transmitting the SYN packets at a ratio equal to or higher than a threshold as a bot candidate.

The determination unit 13*b* then uses the flow data to count the number of candidate bots having communicated with each server (step S103), and determines a server communicating with a predetermined number or more of candidate bots as a malicious server (step S104). For example, the determination unit 13*b* counts the number of candidate bots having communicated with a server by setting an ACK flag in TCP communication, and determines a server communicating with a predetermined number or more of candidate bots as a malicious server.

Next, the detection unit 13*c* detects a bot communicating with the malicious server determined by the determination unit 13*b* as a malicious bot (step S105). Thereafter, the detection device 10 may output the malicious server determined by the determination unit 13*b* and the malicious bot detected by the detection unit 13*c*, as they are, as detection results, or may output only malicious servers and malicious bots satisfying specific conditions after the filtering unit 13*d* performs the above-described filtering processing of detecting only more malicious objects.

Effects of First Embodiment In this manner, the detection device 10 according to the first embodiment identifies candidate bots using the flow data. The detection device 10 uses the flow data to count the number of candidate bots having communicated with each server, and determines a server communicating with a predetermined number or more of candidate bots as a malicious server. The detection device 10 detects a candidate bot having communicated with the malicious server as a malicious bot. Thus, the detection device 10 can detect both a malicious bot and a malicious server with a high degree of accuracy. That is, the detection device 10 extracts candidate bots using the flow data and utilizes a relationship between information of the bots and communication of servers, so that it is possible to achieve detection of both malicious bots and servers with a high degree of accuracy.

For example, while the related art detects a bot and a malicious server from malicious characteristics, the detection device 10 according to the first embodiment performs detection using malicious characteristics and the fact that a bot and a server communicate with each other, so that it is possible to enhance the accuracy with which the detected results are more malicious bots and servers.

System Configuration and The Like In addition, components of the devices illustrated in the drawings are functionally conceptual and are not necessarily physically configured as illustrated in the drawings. That is, the specific aspects of distribution and integration of the devices are not limited to those illustrated in the drawings. All or some of the components may be distributed or integrated functionally or physically in desired units depending on various kinds of loads, states of use, and the like. Further, all or desired some of the processing functions performed by the devices can be implemented by a CPU and a program analyzed and executed by the CPU, or be implemented as hardware based on a wired logic.

In addition, all or some of the processing operations described as automatically performed processing operations out of the processing operations described in the present embodiment may be performed manually. Alternatively, all or some of the processing operations described as manually performed processing operations may be performed automatically by a known method. Furthermore, the processing procedures, the control procedures, the specific names, and the information including various types of data and parameters described in the present specification and the drawings can be optionally changed unless otherwise mentioned.

Figure 7:
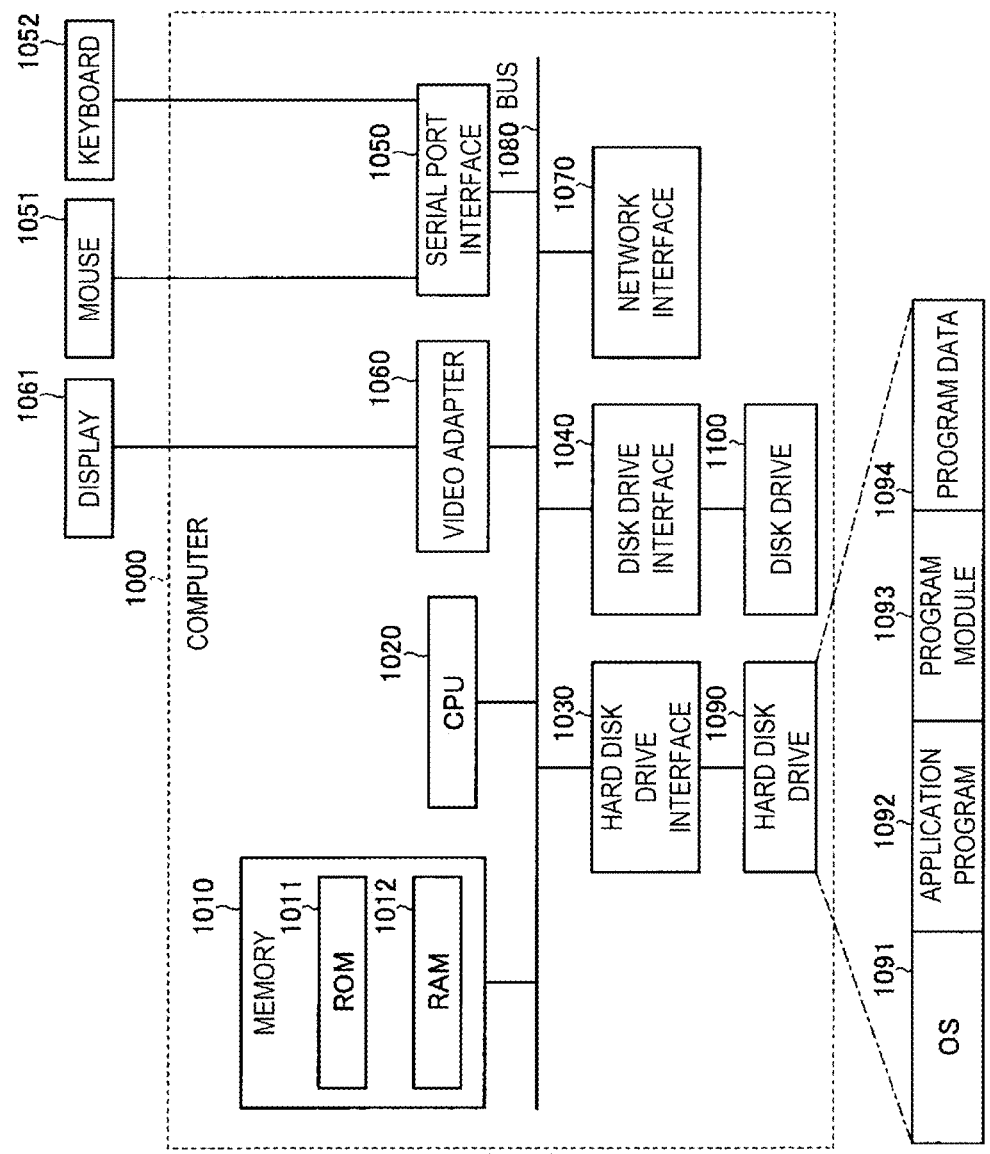
FIG. 7 is a diagram illustrating a computer that executes a detection program.

Program FIG. 7 is a diagram illustrating a computer that executes a detection program. A computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. These units are connected to each other through a bus 1080.

The memory 1010 includes a read only memory (ROM) 1011 and a RAM 1012. The ROM 1011 stores a boot program such as, for example, a basic input output system (BIOS). The hard disk drive interface 1030 is connected to a hard disk drive 1090. The disk drive interface 1040 is connected to a disk drive 1100. A removable storage medium such as, for example, a magnetic disc or an optical disc is inserted into the disk drive 1100. The serial port interface 1050 is connected to, for example, a mouse 1051 and a keyboard 1052. The video adapter 1060 is connected to, for example, a display 1061.

The hard disk drive 1090 stores, for example, an OS 1091, an application program 1092, a program module 1093, and a program data 1094. That is, a program defining each processing performed by the detection device 10 is mounted as the program module 1093 in which computer executable codes are described. The program module 1093 is stored in, for example, the hard disk drive 1090. For example, the program module 1093 for executing the same processing as that performed by the functional configuration in the device is stored in the hard disk drive 1090. Meanwhile, the hard disk drive 1090 may be replaced with a solid state drive (SSD).

In addition, the data used for the processing of the above-described embodiment is stored in, for example, the memory 1010 or the hard disk drive 1090 as the program data 1094. The CPU 1020 reads out and executes the program module 1093 or the program data 1094 stored in the memory 1010 and the hard disk drive 1090, as necessary, in the RAM 1012.

Meanwhile, the program module 1093 and the program data 1094 are not necessarily stored in the hard disk drive 1090, and may be stored in, for example, a removable storage medium and be read out by the CPU 1020 through the disk drive 1100 or the like. Alternatively, the program module 1093 and the program data 1094 may be stored in another computer connected through a network or a wide area network (WAN). The program module 1093 and the program data 1094 may be read out by the CPU 1020 from another computer through the network interface 1070.

REFERENCE SIGNS LIST

10 Detection device
11 Input unit
12 Output unit
13 Control unit
13*a* Identification unit
13*b* Determination unit
13*c* Detection unit
13*d* Filtering unit
14 Storage unit
14*a* Flow data storage unit
14*b* Detection result storage unit

The invention claimed is:

1. A detection device comprising:
processing circuitry configured to:
identify candidate bots using flow data;
use the flow data to count a number of the candidate bots communicating with servers;
determine servers to be malicious servers when the number of candidate bots communicating therewith is equal to or greater than a predetermined threshold; and
detect candidate bots communicating with the servers determined to be malicious servers to be malicious bots.

2. The detection device according to claim 1, wherein the processing circuitry is further configured to use the flow data to calculate a ratio of SYN packets to total transmission packets per predetermined time in unit of IP addresses, and identify an IP address of the IP addresses transmitting the SYN packets at a ratio equal to or higher than a threshold to be a bot candidate.

3. The detection device according to claim 1, wherein the processing circuitry is further configured to count the number of the candidate bots communicating with the servers by setting ACK flags in TCP communication.

4. The detection device according to claim 3, wherein the circuitry is configured to determine that the candidate bots actually communicate information with servers based on the ACK flags set in the TCP communication.

5. The detection device according to claim 4, wherein, as the number of the candidate bots, the circuitry is configured to count only bots that actually communicate information with the servers.

6. The detection device according to claim 1, wherein the processing circuitry is further configured to output a server determined to be a malicious server a predetermined threshold number of times or more in past, among servers determined to be the malicious servers, as a malicious server.

7. The detection device according to claim 1, wherein the processing circuitry is further configured to output a bot a port number of which used for scanning is different from a port number of which used for communication with the malicious servers, among bots detected to be malicious bots, as a malicious bot.

8. The detection device according to claim 1, wherein the flow data includes source IP addresses, destination IP addresses, source port numbers, destination port numbers, communication protocol used, and a control flag.

9. The detection device according to claim 1, wherein the circuitry is further configured to determine a candidate bot as being a malicious bot by comparing the flow data to a blacklist of bots.

10. A detection method comprising:
identifying candidate bots using flow data;
using the flow data to count a number of the candidate bots communicating with servers;
determining servers to be malicious servers when the number of candidate bots communicating therewith is equal to or greater than a predetermined threshold; and
detecting candidate bots communicating with the servers determined to be malicious servers to be malicious bots, by processing circuitry.

11. The detection method according to claim 10, wherein the flow data includes source IP addresses, destination IP addresses, source port numbers, destination port numbers, communication protocol used, and a control flag.

12. The detection method according to claim 10, further comprising determining a candidate bot as being a malicious bot by comparing the flow data to a blacklist of bots.

13. The detection method according to claim 10, further comprising counting the number of the candidate bots communicating with the servers by setting ACK flags in TCP communication.

14. The detection method according to claim 13, further comprising determining that the condidate bots actually communicate information with servers based on the ACK flags set in the TCP communication.

15. The detection method according to claim 14, wherein, as the number of the candidate bots, only bots that actually communicate information with the servers as counted.

16. A non-transitory computer-readable recording medium storing therein a detection program that causes a computer to execute a process comprising:
identifying candidate bots using flow data;
using the flow data to count a number of the candidate bots communicating with servers;
determining servers to be malicious servers when the number of candidate bots communicating therewith is equal to or greater than a predetermined threshold; and
detecting candidate bots communicating with the servers determined to be malicious servers to be malicious bots.

17. The non-transitory computer-readable recording medium according to claim 16, wherein the flow data includes source IP addresses, destination IP addresses, source port numbers, destination port numbers, communication protocol used, and a control flag.

18. The non-transitory computer-readable recording medium according to claim 16, further comprising determining a candidate bot as being a malicious bot by comparing the flow data to a blacklist of bots.

19. The non-transitory computer-readable recording medium according to claim 16, further comprising counting the number of the candidate bots communicating with the servers by setting ACK flags in TCP communication.

20. The non-transitory computer-readable recording medium according to claim 19, further comprising determining that the candidate bots actually communicate information with servers based on the ACK flags set in the TCP communication,
wherein, as the number of the candidate bots, only bots that actually communicate information with the servers are counted.

\* \* \* \* \*